C. J. WILKERSON.
WATER TANK AND FILTER.
APPLICATION FILED SEPT. 2, 1914.
1,152,998.
Patented Sept. 7, 1915.
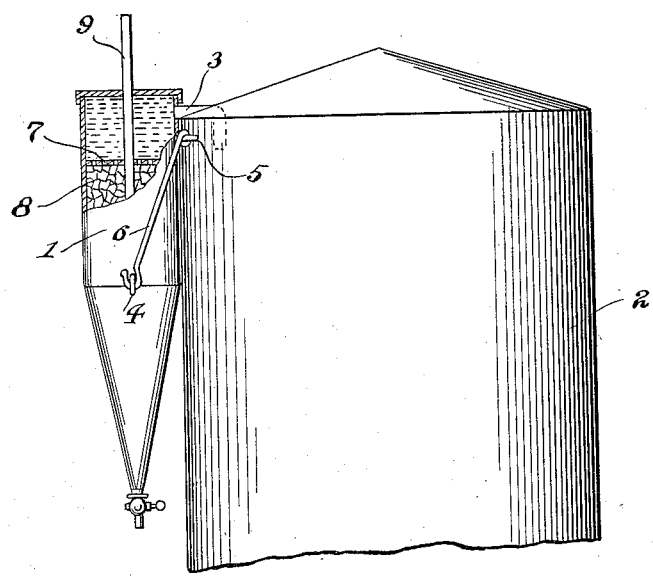
Inventor
Charles J. Wilkerson.
Witnesses
By Victor J. Evans
Attorney

UNITED STATES PATENT OFFICE.

CHARLES J. WILKERSON, OF LEONARD, TEXAS.

WATER TANK AND FILTER.

1,152,998.   Specification of Letters Patent.   Patented Sept. 7, 1915.

Application filed September 2, 1914. Serial No. 859,826.

*To all whom it may concern:*

Be it known that I, CHARLES J. WILKERSON, a citizen of the United States, residing at Leonard, in the county of Fannin and State of Texas, have invented new and useful Improvements in Water Tanks and Filters, of which the following is a specification.

This invention is an improved water filter for filtering rain or hydrant water for domestic use, and also for other purposes the object of the invention being to provide an improved device of this character which is cheap and simple, and which is readily kept clean and in a sanitary condition.

A further object of my invention is to provide a filter which may be carried upon the side of a tank in such a manner, that it may be readily removed therefrom or swung away from the side thereof for sundry purposes without detaching it from the tank.

The invention consists in the construction, combination and arrangement of device hereinafter described and claimed.

In the accompanying drawings: the figure is a vertical sectional view of a water tank and filter constructed in accordance with my invention.

It will be seen that I provide a filter 1 arranged at one side and near the top of a tank 2, for receiving the filtered water which passes from the upper portion of the filter through a pipe or spout 3 into the tank. The filter which is preferably substantially conical in shape is provided with a pair of perforated lugs, one of which is shown at 4, at diametrically opposite points and arranged at a suitable distance from its lower end.

Near the top of the tank and on the side adjacent the filter and above the lugs on the filter are a pair of perforated lugs, one of which is shown at 5. Depending from these lugs and formed so as to swingingly engage them, are supporting rods one of which is shown at 6 with hooks formed on their lower ends which engage the perforated lugs on the filter 1 and hold it in sustained relation to the tank.

In practice my filter may be constructed with a perforated disk 7 arranged slightly below the top and secured therein, with a filtering element 8 suitably secured below the disk and with a supply pipe 9 discharging into the filter, through the disk 7 and the filtering element 8. It will be understood however, that I do not limit myself to any specific construction of the filter, which may be of any suitable size or shape.

The operation of the invention is as follows:—The filter 1 is filled by the pipe 9 and the water is filtered and rendered sterile by the element 8. The water is then collected in the upper portion of the filter and passes into the tank 2 through the pipe 3.

When it is desired to remove or repair the filter it may be swung away from the side of the tank in a vertical plane, owing to the swinging engagement of the rods 6 with the lugs 5, without detaching it therefrom or it may be lifted out of engagement with the hooks on the lower ends of the rods, and removed from the side of the tank.

As this filter is specially designed to be detached on the side of high tanks, and which can only be reached by use of a ladder, it will be seen that owing to this arrangement of the rods and lugs all parts are at all times readily accessible.

I claim:—

1. In combination, a tank provided with perforated lugs secured thereon in spaced relation, a filter adjacent said tank and having securing lugs thereon, said filter adapted to discharge into said tank, rods adapted to swingingly engage the lugs on said tank, with hooks on the ends thereof adapted to engage the securing lugs on said filter whereby said filter is sustained in secured relation to said tank.

2. In combination, a tank with perforated lugs near the top thereof, a filter adjacent the side of said tank and near the top thereof and adapted to discharge into the tank at the top thereof, said filter having perforated lugs secured thereon at diametrically opposite points and below the lugs on said tank, rods having hooks on the lower ends thereof and adapted to swingingly engage the lugs on said tank and detachably engage the lugs on said filter, whereby the filter is detachably supported on the side of said tank and may be swung away and lifted above said tank without detaching the filter, substantially as described.

In testimony whereof I affix my signature in presence of two witnesses.

CHARLES J. WILKERSON.

Witnesses:
 JOE Z. STUART,
 W. E. COX.

Copies of this patent may be obtained for five cents each, by addressing the "Commissioner of Patents, Washington, D. C."